United States Patent [19]
Frank et al.

[11] 3,731,970
[45] May 8, 1973

[54] MOTOR HOME CONSTRUCTION

[76] Inventors: Ronald R. Frank, 24 Van Dyke, Marlette, Mich. 48453; Raymond C. Frank, 4083 Second Street, Brown City, Mich. 48416

[22] Filed: Mar. 4, 1971

[21] Appl. No.: 121,062

[52] U.S. Cl. ................................296/23 R, 296/10
[51] Int. Cl. ..............................................B60p 3/32
[58] Field of Search ..............................296/10, 23 R

[56] References Cited

UNITED STATES PATENTS

| | | | |
|---|---|---|---|
| 3,501,194 | 3/1970 | Frank | 296/23 |
| 2,591,380 | 4/1952 | Schreiner | 296/10 |
| 1,420,298 | 6/1922 | White | 296/10 |

Primary Examiner—Philip Goodman
Attorney—Dale A. Winnie

[57] ABSTRACT

The means and method of constructing a motor home from a vehicle having a delivery van body style and which includes cutting away the old roof and the back end of the van body, providing an integral replacement roof and back end extension for attachment to the cut-away body with the new roof carried on the edges of the old one, over the drip molding, and the side edges of the extension having a fastening flange bonded to it that is attached to the inturned edge at the back end of the cut-off van body. Internal wall finishing is by use of full wall panels, formed and fitted for cupboard space, and frame extensions afford additional storage space.

12 Claims, 11 Drawing Figures

PATENTED MAY 8 1973

INVENTORS
Raymond C. Frank &
BY Ronald R. Frank
Winnie & Romanski
ATTORNEYS

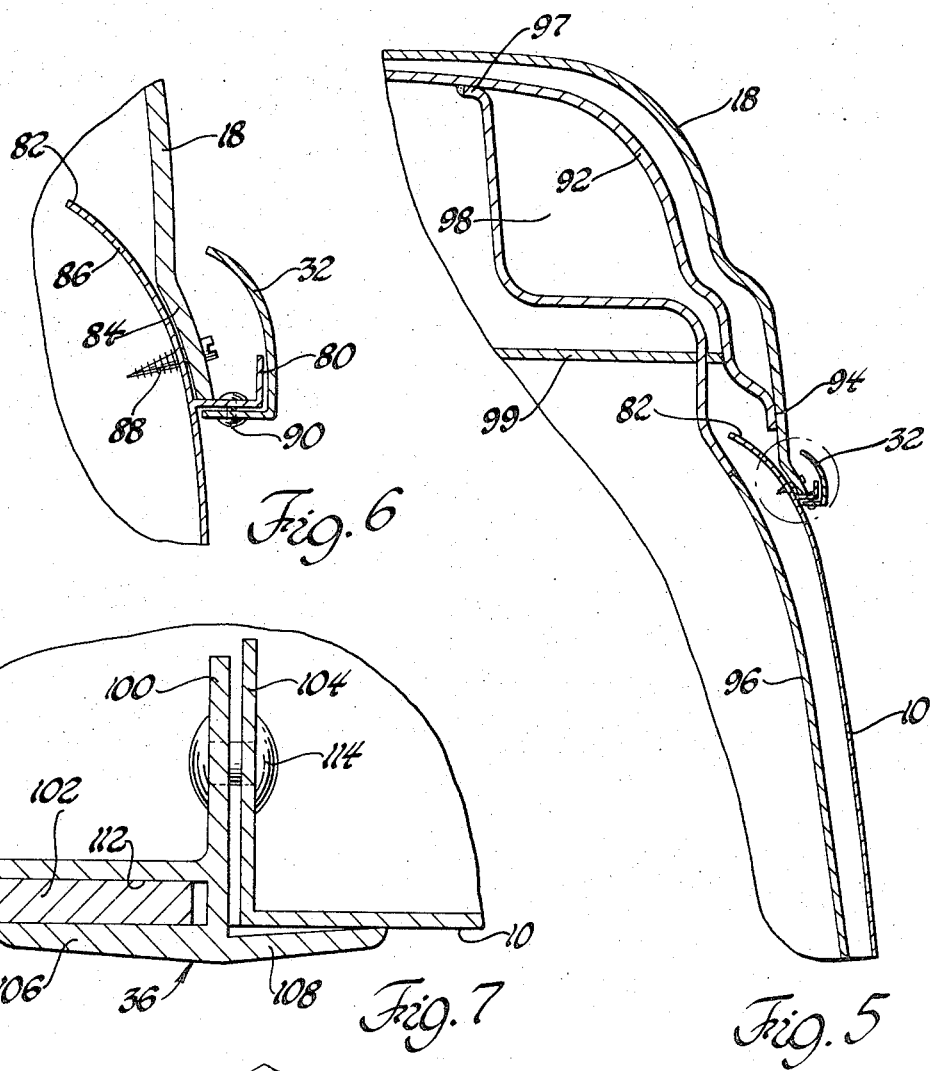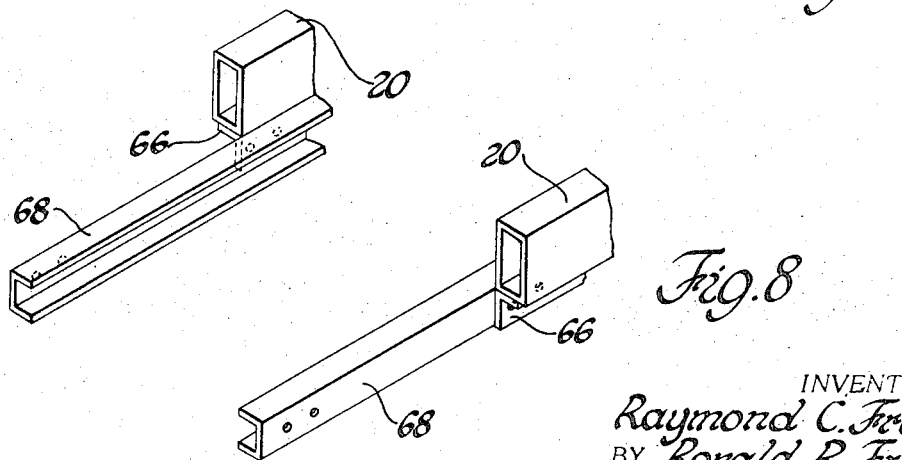

PATENTED MAY 8 1973

INVENTORS
Raymond C. Frank &
BY Ronald R. Frank

Winnie & Komanski

ATTORNEYS

MOTOR HOME CONSTRUCTION

BACKGROUND OF THE INVENTION

Motor home living for extended weekends and vacation time are becoming more and more popular. They offer a mobility that trailers and other campers cannot match as well as year round use for the whole family.

Heretofore it was necessary to build a suitable motor home for the chassis up, so to speak, since there were no body styles on commercially available vehicles that were suitable for use or could be readily adapted for outfitting as needed. Now, however, the delivery van with its low unobstructed floor space offers great potential for a low cost motor home that can be relatively mass produced for the average person. Its principal shortcomings are that it is not quite long enough and that it does not really have enough head room to allow most adults to stand up and walk about freely.

Although bubble tops have been added to some converted vans and the body length has been increased, either by sectioning in or a larger wheel base or hanging an extension on the end of the vehicle, none have proven commercially successful. The cost has been too prohibitive or the results generally unsatisfactory.

SUMMARY OF THE INVENTION

This invention is directed to a new and novel means and method of construction for converting a commercially available delivery van vehicle into a more livable motor home.

The basic vehicle is retained in tact, except for havings its roof removed, just above the drip molding, and having the back end of the van cut-off.

A one-piece extension, for the back end of the van, and a new roof, with a higher profile, is then formed, preferably of fiberglas, and attached to the existing vehicle body. The weight of the extension is carried, in large part, forwardly on the vehicle body through the attachment of the roof to the vehicle body throughout substantially the full length thereof. Added support is obtained in the special means used to fasten the side walls of the extension to the cut-off and inturned end walls of the van.

The extension is then tied to the vehicle frame, not as a matter of support, but for structural stability, through an extension of the vehicle frame provided on the back end of the van. This also assures frame support for the bumper, on the back of the van, and that impact forces will be carried through to the vehicle frame.

Other features of novelty, as regards reduced costs of construction and utility, include the use of full wall panels of fiberglas, formed to include storage space, as and where desirable, and a holding tank drainage system protected from freezing weather and road grime problems. These and other notable features will be further discussed in the detailed description of a motor home constructed in accord with the teachings of this invention, which follows hereinafter.

DESCRIPTION OF THE DRAWING FIGURES

FIG. 5 is a cut-away and cross-sectioned view of the new roof and full panel wall construction used in finishing the interior of the motor home.

FIG. 6 is an enlarged detail view, from the circled area in the preceding drawing figure, showing the means of attaching and supporting the new roof, and the body extension, to the vehicle body.

FIG. 7 is an enlarged detail, cross-sectioned, and showing the means of attaching the side wall edges of the body extension to the back of the delivery van body.

FIG. 8 is a perspective view of the vehicle frame ends and the parts of the frame extension under the box sectioned member shown in drawing FIG. 4.

DESCRIPTION OF THE PREFERRED EMBODIMENTS

Figure 1:
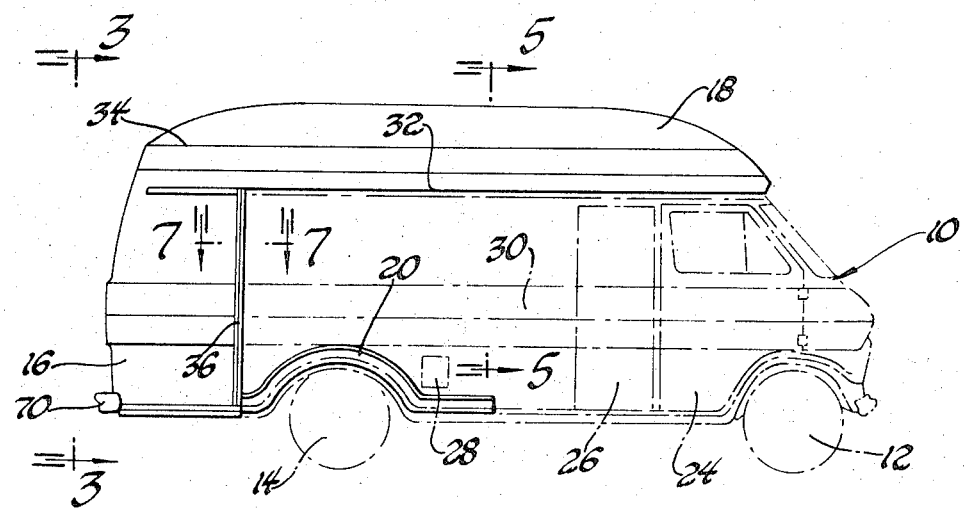
FIG. 1 is a side view of a new roof and back end extension for a commercially available delivery van vehicle, with the van shown in phantom outline relative thereto.

A delivery van 10 is shown in phantom outline in the first drawing figure to better distinguish the change that is made to it. This is the basic body style upon which the motor home of the present invention is built.

It includes a vehicle with the engine and transmission (not shown) located relatively between the front wheels 12 and with the drivers position beside the engine, on one side. This provides an unobstructed floor space in the vehicle which enables it to be outfitted with the accommodations that will make it into a suitable motor home.

The rear wheels 14 of the vehicle are in housings which are enclosed, in the completed motor home, within counter and closet spaces, as will later be more fully appreciated.

In order to provide additional length to the delivery van vehicle, which would otherwise be relatively short for motor home use, an extension 16 is added to the back of the van 10 and to provide additional head room, a new roof 18 is provided over and above the old one, which is cut-away as discussed later.

Figure 2:
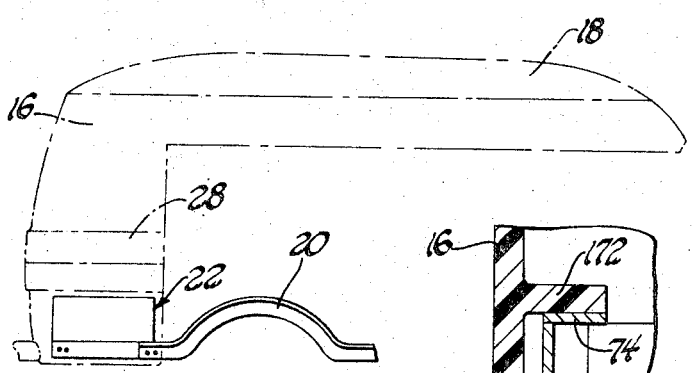
FIG. 2 is a side plane view of the end of the vehicle frame, including a frame extension, and shows the new roof and body extension in phantom outline relative thereto.

The extension 16 and new roof 18 are made as one integral part, of fiber glass, as is depicted in phantom outline in FIG. 2. This particular drawing figure also shows part of the vehicle frame 20 with a box structure extension 22 that extends the frame and has the body extension 16 tied to it.

Referring back to FIG. 1, there is shown a vehicle door 24, on the passenger side, which provides normal access to the motor home. Along side it is another door 26 which is normally kept closed but can be used as a service door to the vehicle. Rearwardly of the service door 26 is a small hinged door 28 provides access to the holding tank drainage system.

The styling of the delivery van is continued into the rear end extension 16 as is shown by the slight body style protrusion 30 at the waist line of the vehicle. The drip molding line 32 is also relatively the same, following through on the extension, and the new roof 18 is provided with such asthetic contours 34 as will serve to make the motor home more attractive.

A special body molding strip 36 is used between the terminal end of the van 10 and the extension 16. This may be decorative in appearance or matched with the body paint of the motor home so that it is hardly visible.

Both the drip molding arrangement and the body molding strip 36 are of special design and are used in the attachment of the rear end extension 16 to the van, as will be described later.

Figure 3:
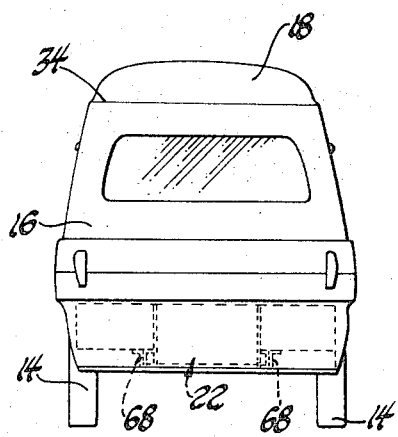
FIG. 3 is a rear end view of the motor home conversion showing the frame extension as disposed in the body extension.
Figure 4:
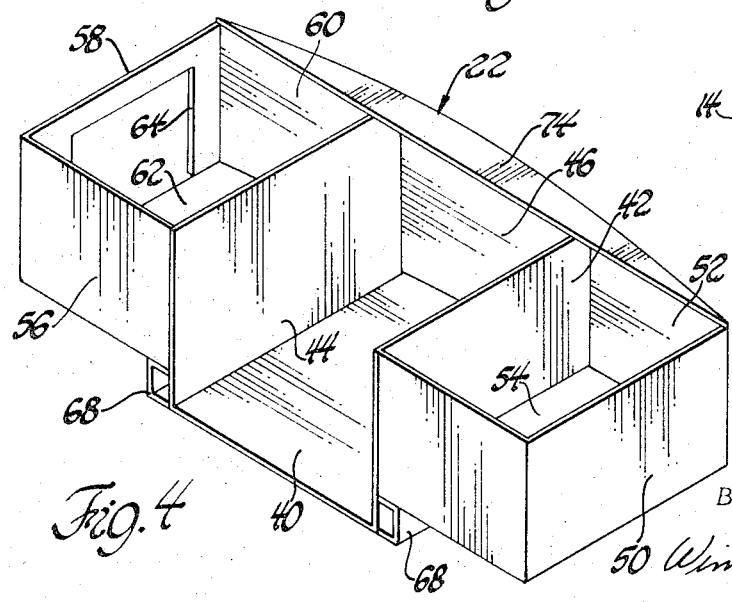
FIG. 4 is a perspective view of the vehicle frame extension, by itself.

FIGS. 2–4 together with FIG. 8 show the structural arrangement by which the vehicle frame 20 is extended by use of the sheet metal structure 22. The box sectioned structure includes a center section including a bottom wall 40, side walls 42 and 44, and a back wall 46. The top and front are open and face into the vehicle. On one side is a box formed from the one side wall 42 and three walls 48, 50 and 52 along with a bottom 54. On the other side is another box formed with the other side wall 44, three walls 56, 58 and 60, and a bottom wall 62.

Both of the box sections, on the sides, are open at the top for access from within the vehicle, if desired. The one, however, also includes an opening 64 in the wall 58 to enable access from outside the vehicle, as through a storage door on the left side of the motor home (not shown).

FIG. 8 shows the ends of the vehicle frame 20 with angle iron members 66 welded underneath, near their ends, to receive channel sectioned member 68 which are structurally fastened to them and are of a length to extend under and receive the side boxes supported on them. They are tack welded to the lower edges of the inner box walls 42 and 44 as well as to the bottom walls 54 and 62 of the two side box sections which rest on them.

The top edges of all the box walls 42, 44, 48, 50, 52, 56, 58 and 60 are at the same height and serve as a support for the bed provided in the motor home. Access may be had to the storage spaces provided by the box structure extension either by lifting up the bed support (not shown) or by a storage door, if provided, in the riser under and at the front edge of the bed, in the motor home.

A bumper 70 is provided at the back of the motor home, but it is not connected to the after-end extension 16. Instead it is hung with the usual brackets (not shown) on the channel members 68 so that any and all impact forces it received are transmitted through to the vehicle frame, in the usual manner.

The back walls 46, 52 and 60 of the box sectioned frame extension 22 are curved or otherwise arranged as necessary to more suitably match the back end contour of the extension 16. This is to bring the frame extension close enough to the fiberglas extension of the van so that the two can be tied together and some support, but principally rigidity for the body extension, can be provided directly from the vehicle frame.

Figure 2A:
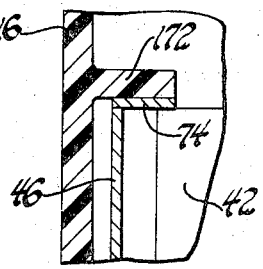
FIG. 2a is a fragmentary detail view, greatly enlarged, from the circled area in the preceding drawing figure, showing how the body extension is connected to the vehicle frame extension.

Referring to FIG. 2a, one way this is done is to form a shoulder wall 72 on the inside of the fiberglas shell that provides the extension 16 and to have a suitable supporting flange 74 welded across the top of the frame extension 22 at its back edge. This forms a pad on which the weight of the van extension 16 rests and to which it may be bonded or otherwise attached.

This is not the means of support for the extension 16, however, and in subsequent discussion it will be appreciated that having the roof structure 18 formed with and as an integral part of the extension enables a significant amount of the after-end weight to be transferred and carried forwardly on the main body of the motor home van, through the roof attachment to the van body. And, that there is additional support in the means provided for holding and securing the side walls of the extension 16 to the cut-off end walls of the van.

The old van roof is cut out just above the drip molding, in the crown of the roof, as at 82, referring to FIG. 5, and the edge 84 of the new roof is formed to fit closely to the remaining edge 86 of the old roof and so that it can be supported on it and secured to it, as by screw fasteners 88.

The old drip molding 80, which provides a shoulder stop and helps center the new roof, is then covered by the ornamental molding 32, which is slightly wider and curves inwardly just high enough to hide the screw fasteners 88. It is fastened to the old drip molding by rivets 90, or like fastening means, from the underside.

FIG. 5 shows other details of construction including the inner roof wall 92, which is also of fiberglas, formed to the general contour of the new raised roof part 18 and spaced from it, for insulation purposes, except where it is bonded to the new roof, as at 94. Also shown is the side wall construction, inside the motor home, which includes the use of a whole wall panel 96, of fiberglas, molded to desired contours and having its upper and lower edges bonded to the inner roof wall 92 as at 97 and fastened at floor level, counter top height, bed height, or whatever. The particular panel wall 96 shown is, in this instance, formed to include storage spaced 98 over the seating space in the motor home. This drawing figure also shows a storage spaced shelf 99 that is provided within the replacement roof, over the driver's space, across and between the side edges of the replacement roof for structural reinforcement at the front end.

FIG. 7 shows the body molding strip 36 between the extension 16 and the end of van 10 and how it is used to fasten and secure the fiberglas extension to the sheet metal body of the van.

The molding strip member is really much more than that and includes a web or fastening flange 100 that is received between the edge wall 102 of the extension and an inturned flange 104 provided on the cut-off end of the van. It has facing flanges 106 and 108 which are integral and overlap the opening through which the fastening flange 100 extends.

A flange wall 110 in parallel spaced relation behind the facing flange leg 106 provides a space 112 within which the fiberglas edge wall 102 of the extension is received and bonded. Rivet or other fastener means 114 are then used to secure the fastening flange 100 of the strip to the inturned flange 104 on the van body.

Figure 9:
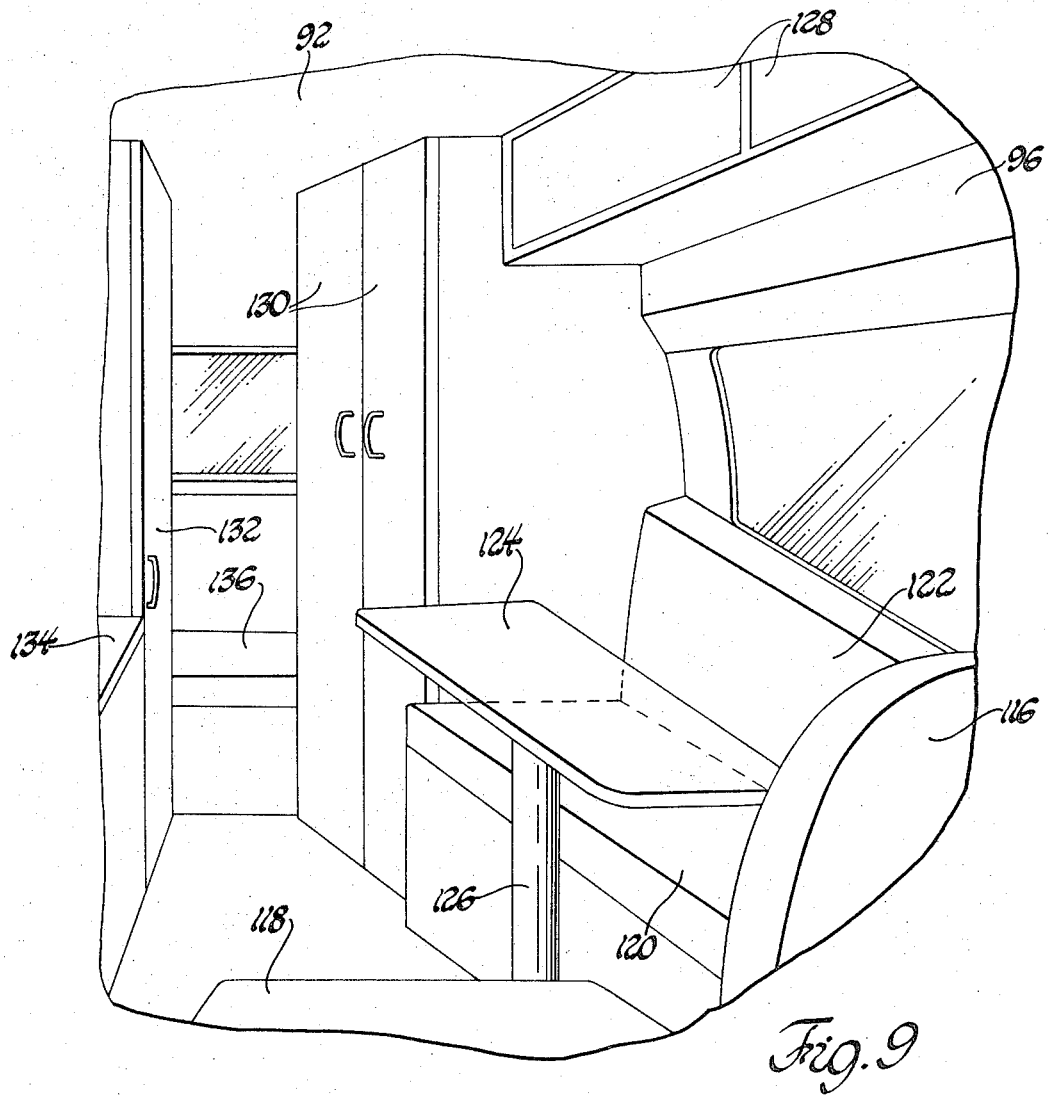
FIG. 9 is a perspective view of the interior of the converted motor home of the present invention.

FIG. 9 shows the interior of a finished motor home. The driver's seat 116 and motor housing cover 118 are only partially visible at the lower edge of the drawing figure. Immediately behind the driver's seat is a long couch or seat 120 and back 122 that open up to provide a bed, as and when needed. In front of this is a table 124 on a pedestal 126.

There is storage space under the couch and also built into the fiberglas wall panel over the couch, as previously mentioned and as is here apparent by the sliding cabinet doors 128.

Clothes closets 130 and a bathroom closet 132 are provided further back, on opposite sides with the bathroom closet space behind the kitchen facilities, only the counter 134 of which shows. At the back of the motor home, in what is the extension 16, a bed 136 is shown as disposed on a support over the box sectioned frame extension 22.

Figure 10:
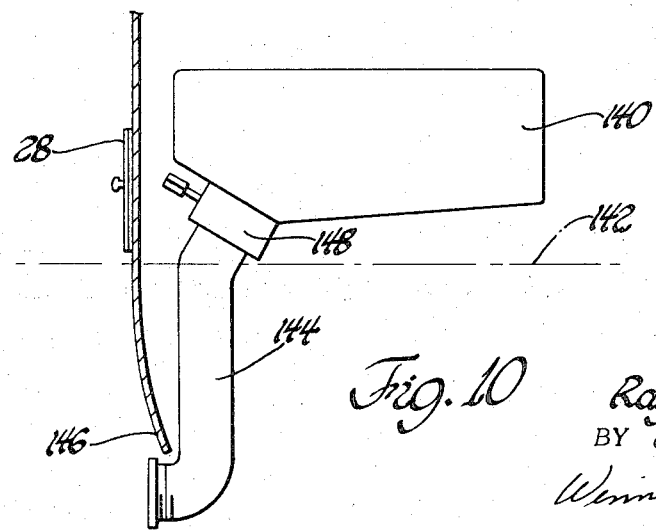
FIG. 10 is a side plan view of the holding tank, in relation to the vehicle body, and shows the protected disposition of the drainage valve used therewith.

The last drawing figure, FIG. 10, shows the particular arrangement used for draining the holding tank in the motor home. The tank 140 is located above the floor level, indicated at 142, within the vehicle under the kitchen counter and sink. It has a downwardly depending drainage conduit 144, that extends below the lower edge 146 of the body and is open at the end. A sluice valve 148 is provided in the drainage conduit right at the holding tank, above floor level, so that it is relatively protected from road dirt and winter freezing. The valve handle is readily accessible through the hinged door 28 mentioned earlier and which is shown in the first drawing figure in its relative location on the outside wall of the vehicle body.

From the foregoing it can be seen that a very practical means has been devised for constructing a motor home from a commercially available vehicle having a delivery van body style.

The old vehicle roof is cut away within the crown of the roof, over the drip molding, and the new roof is received and supported on the remaining edges of the old roof and then attached to it. The drip molding serves as a shoulder stop in the support and centering of the new roof over the roof hole and it also provides a means of attaching a new drip molding which covers the new roof fastener means.

Since the replacement roof and the body extension are formed together they are structurally integral and the weight of the extension is afforded support at the back of the van body through the replacement roof clear up into the vehicle body. With a full length vehicle roof there is, in fact, considerable cantelever support for the extension that is provided by the roof attachment to the van body.

Added support for the extension is obtained by the fastener means 36 at the side edges, which receive and have the extension edges bonded to it and which are fastened by rivets or other means to the inturned flanges at the back of the cut away van body.

Tying the body extension to the vehicle frame, through its extensions, is principally to provide greater stability for the extension and is not for weight carrying purposes. The greatest load in the extension is the bed and it is supported on the vehicle frame, essentially, through the box-sectioned reinforcement ties between the extended frame members.

The interior of the van body is finished off with full wall and ceiling panels which are both attractive, in eliminating seams, fastening strips and the like, and less expensive to install since they avoid high cost finishing skills.

I claim:

1. Vehicle construction to provide a motor home for travel use and enjoyment, and comprising;

a motor vehicle including a body of delivery van style which affords drivers space near the front end of the vehicle and relatively unobstructed floor space therebehind to accommodate travel home furnishings, said body having a relatively low profile roof which is cut away above the body side walls and within the crown of the roof and is removed to provide a roof opening extending relatively over the unobstructed floor space within said body, a replacement roof formed to cover and close said opening and to include sufficient depth to provide additional head room upon being mounted on and attached to said body, said replacement roof having terminal edges formed generally to the contour of the remaining crown of the former roof for close fitting engagement therebetween in the support of the replacement roof on said body and its attachment thereto, a peripheral flange on said body externally, about and relatively below the roof opening covered by the replacement roof for providing a shoulder stop for the terminal edges of the replacement roof and the relative alignment and support thereof on said body, and means for fixedly attaching said replacement roof to said body immediately next adjacent and over said peripheral shoulder flange.

2. The vehicle construction of claim 1, said replacement roof extending substantially the length of said body and over the driver's space, and a storage space shelf provided within said replacement roof over said driver's space across and between the side edges of the replacement roof for structural reinforcement at the front end thereof.

3. The vehicle construction of claim 1, including a decorative member attached to said shoulder flange and extending relatively thereover for functionally obscuring the roof attachment means and providing a drip molding about the replacement roof.

4. The vehicle construction of claim 1, including a rear end extension for said body to provide added length and more motor home space therewithin, said body having its back end cut away to provide a rearwardly disposed opening and with the body side wall edges turned in to form mounting flanges for the attachment of the body extension thereto, and means for attaching the side wall edges of the extension to said mounting flanges and for obscuring the connection therebetween.

5. The vehicle construction of claim 4, including having the body extension structurally attached to the replacement roof for the weight carrying advantage derived therefrom.

6. The vehicle construction of claim 4, including having the replacement roof and the body extension formed integrally together and of fiberglas for added structural strength therebetween.

7. The vehicle construction of claim 4,
including extensions of the frame of the vehicle beyond the rear wheels thereof and within the body extension,
structural reinforcement between the frame extensions formed to provide a plurality of storage compartment spaces within the lower part of the body extension and to provide a support for a bed thereover and within the body extension,
and means for tying the body extension to the frame extensions through the structural reinforcement therefor.

8. The vehicle construction of claim 7,
said structural reinforcement including wall members for forming said compartment spaces and which have their top edges relatively parallel,
and said tying means including a flange on the inside back wall of said extension received on and for fastening to the top edges of the after-most of said compartment space forming wall members.

9. The vehicle construction of claim 7,
said frame extensions being disposed under the compartment space forming structural reinforcement therebetween and exposed rearwardly for the attachment of the vehicle bumper thereto.

10. The vehicle construction of claim 4,
said side walls attaching means including a member having a facing flange overlapping the next adjacent side walls of said body and side edges of said extension,
a fastening flange normal to said facing flange and extending between said body side walls and extension edges for fastening to the inturned edges of said body side walls,
and a flange wall off the fastening flange and in parallel spaced relation to said facing flange for receiving and having the side edges of said extension bonded and retained in the receptive space provided therebetween.

11. Motor home construction from a commercially available vehicle having a delivery van body style, and comprising cutting away and existing roof of the van body substantially therearound and within the crown over the drip molding, cutting away the back end of the van body and turning a flange inwardly at the side edges thereof, forming a replacement roof with greater head room and a body extension for added length together and for attachment to the cut away van body, supporting the replacement roof on the roof edges remaining relatively over the drip molding and attaching it thereto, the weight of the body extension being carried substantially by the replacement roof attachment through the roof and into the van body, and attaching the side walls of the body extension to the inturned flanges at the cut away end of the van body for added load bearing support.

12. The motor home construction of claim 11,
including forming the replacement roof and extension integrally and of fiberglas for added structural strength therebetween.

* * * * *